May 1, 1962 P. E. PRUTZMAN, JR 3,031,929
TRUCK MIRROR CONSTRUCTION
Filed Dec. 7, 1959
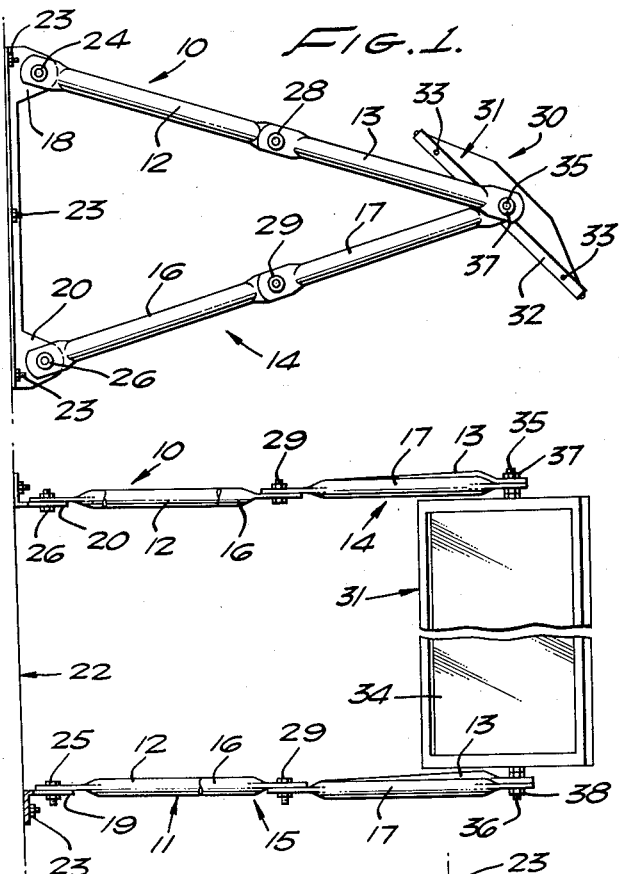
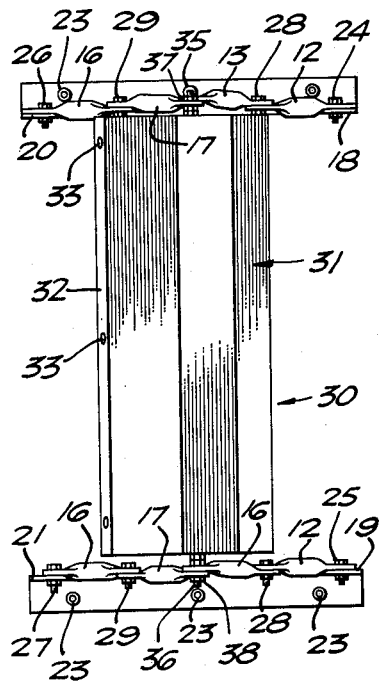
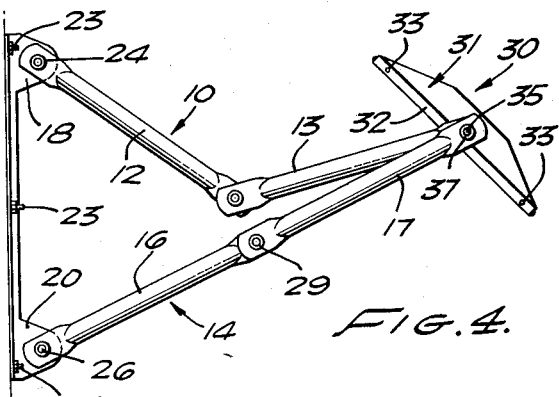
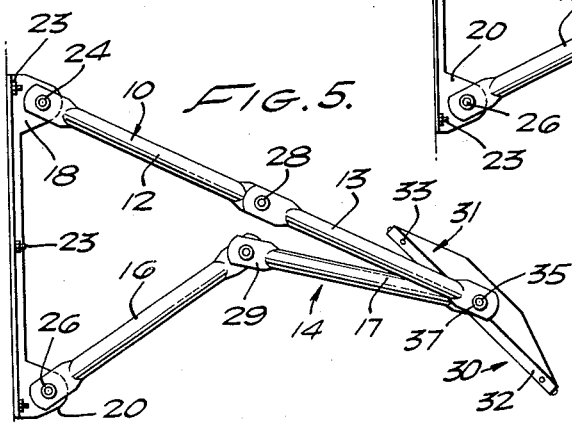
PAUL E. PRUTZMAN, JR.
INVENTOR.
KENDRICK, SCHRAMM AND STOLZY
BY
A. Donald Stolzy
ATTORNEYS

United States Patent Office 3,031,929
Patented May 1, 1962

3,031,929
TRUCK MIRROR CONSTRUCTION
Paul E. Prutzman, Jr., Santa Barbara, Calif., assignor, by mesne assignments, to Lansing Company, Lansing, Mich., a corporation of Michigan
Filed Dec. 7, 1959, Ser. No. 857,957
4 Claims. (Cl. 88—98)

This invention relates to rear view mirrors for motor vehicles, and more particularly to a mirror for a motor truck and a bracket for attachment of such a mirror to the cab of the truck.

To the present time, a bracket such as described and claimed in U.S. Patent No. 2,708,086 has been employed to support rear view truck mirrors. The bracket of this patent includes upper and lower solid extension members and pivoted or jointed upper and lower brace members adapted for connection at their inner ends at spaced positions along the side of a truck cab. The outer ends of the upper extension and brace members are connected together, and the outer ends of the lower extension and brace members are also connected together. A U-shaped frame is then connected from the ends of the extension members to support a truck mirror vertically thereon.

Although the bracket of said patent is unusually useful, in some applications it has been found desirable to use a different construction in accordance with the present invention.

In the first place, the present invention contemplates the use of a pivoted connection at the outer ends of the upper extension and brace members, and at the outer ends of the lower extension and brace members, between which pivoted connections a rearview truck mirror is mounted. Thus, a saving is realized in terms of component parts in that the U-shaped frame of the said patent is not employed.

Still further, both upper and lower extension members are not made solid in accordance with the invention as in the case of the patent, but in accordance with the invention the extension members are provided with two sections jointed or pivotally connected together as in the case of the brace members of the patent. Also in accordance with the invention, jointed brace members similar to those disclosed in the said patent are employed. Due to the fact that both the extension and brace members are provided with two sections pivoted together, an additional advantage is derived.

In the first place, it is an advantage of the patented bracket that the mirror on it rotates with the U-shaped frame in a rearward direction when the truck moves in a forward direction and the U-shaped frame comes in contact with a fixed obstacle to protect the mirror from damage. However, it has been necessary to use the U-shaped frame to permit the mirror to rotate in a forward direction when the truck is backing up and the mirror happens to collide with a fixed obstacle which could damage it.

In accordance with the present invention, the U-shaped frame is obviated although the construction of the bracket of the invention permits the mirror to move either in a forward or a rearward direction when it comes in contact with a fixed obstacle and the truck on which it is mounted moves in either a forward or rearward direction. This is true because of the pivoted sectional construction of each one of each pair of extension and brace members described above.

It is also a feature of the present invention that both pivoted sections of both pairs of extension and brace members employed are the same length. This not only permits a saving in installation time, but it also makes for substantial reduction in manufacturing cost. It is to be noted that there is a complete interchangeability of parts in that a single section may be employed in any extension or brace member.

The invention will be better understood when considered in connection with the following description. In the accompanying drawings, which are to be regarded as merely illustrative:

FIG. 1 is a top plan view of a truck mirror construction made in accordance with the invention;

FIG. 2 is an elevational view of the construction shown in FIG. 1;

FIG. 3 is a side elevational view of the truck mirror construction shown in FIGS. 1 and 2; and FIGS. 4 and 5 are top plan views of the truck mirror construction of the invention in which the bracket therefor is bent, respectively, forwardly and rearwardly of the position shown in FIG. 1.

In the drawing, one embodiment of the truck mirror construction of the invention is shown including upper and lower extension members 10 and 11 having inner and outer sections 12 and 13, and upper and lower brace members 14 and 15 having inner and outer sections 16 and 17. All the sections 12, 13, 16 and 17 are equal in length. The inner ends of extension and brace members 10, 11, 14 and 15 are fixed to brackets 18, 19, 20 and 21, respectively, which are fixed to a truck cab 22 by means of bolts 23. The inner ends of extension and brace members 10, 11, 14 and 15 are fixed to corresponding brackets 18, 19, 20 and 21 by means of bolts 24, 25, 26 and 27, respectively. Sections 12 and 13 of upper and lower extension members 10 and 11 are pivoted together at their mutually adjacent ends by means of bolts 28. Similarly, sections 16 and 17 of brace members 14 and 15 are pivoted together by bolts 29.

A truck mirror assembly 30 is mounted between the mutually adjacent ends of sections 13 and 17 of upper and lower extension and brace members 10, 14, 11 and 15, respectively. Truck mirror assembly 30 includes a housing 31 having a retaining rim 32 fixed thereto by means of metal screws 33 to retain a mirror glass 34 in housing 31. A pair of upper and lower studs 35 and 36, respectively, are fixed to housing 31 and extend upwardly through holes provided in the outer ends of extension and brace members 10, 14, and 11, 15, respectively, provided therefor. Mirror assembly 30 is maintained in a fixed position relative to the extension and brace members 10, 11, 14 and 15 by means of lock nuts 37 and 38 on upper and lower studs 35 and 36, respectively.

As explained previously, the use of the mirror assembly 30 mounted directly on the ends of extension and brace members 10, 11, 14 and 15 by means of studs 35, 36 and nuts 37, 38, make it unnecessary to use a U-shaped member as in the case of U.S. Patent No. 2,708,086. Still further, preferably all sections 12, 13, 16 and 17 are made exactly the same length whereby any sections 12, 13, 16 and 17 may be substituted for any other section. Still further, it is to be noted that if the truck 22 backs up, the bracket, including extension and brace members 10, 11, 14 and 15, may move as indicated in FIG. 4 to protect the mirror assembly 30 from damage in the event the latter hits an obstacle. In other words, the sections 12 and 13 of the brace members 10 may be disposed at an angle as shown in FIG. 4 to hold the mirror assembly 30 forward of its position shown in FIG. 1. Similarly, if the truck 22 moves in a forward direction and the mirror assembly 30 hits a fixed obstacle, sections 16 and 17 may be disposed at an angle with respect to each other as shown in FIG. 5, and the mirror assembly 30 thus protected from damage due to striking the obstacle.

The construction of the sections 12, 13, 16 and 17 of the extension and brace members 10, 11, 14 and 15 may be as indicated in the drawings including hollow tubular members "mashed flat," so to speak, at each end thereof.

Although many changes and modifications of the invention will, of course, suggest themselves to those skilled in the art, it is to be understood, in particular, that even though only one specific embodiment of the invention has been illustrated and described hereinbefore, the specific embodiment illustrated and described is merely illustrative, and the invention is not to be limited thereto, the true scope thereof being defined only in the appended claims.

What is claimed is:

1. A mirror arrangement for a motor vehicle, said arrangement comprising: upper and lower pairs of bracket members, said upper bracket members each having two sections extending in a predetermined horizontal plane from the vehicle, said sections of said upper bracket members being pivoted together, said lower bracket members each having two sections extending in a horizontal plane parallel to said predetermined horizontal plane from the vehicle, said sections of said lower bracket members being pivoted together, the inner ends of each pair of said bracket members being adapted for connection to the vehicle at spaced positions along the side thereof, the outer ends of each pair of said bracket members being pivotally connected together; and a mirror mounted between the outer ends of said pairs of bracket members to rotate about a vertical axis.

2. A mirror arrangement for a motor vehicle, said arrangement comprising: upper and lower pairs of bracket members, said upper bracket members each having two sections extending in a predetermined horizontal plane from the vehicle, said sections of said upper bracket members being pivoted together, said lower bracket members each having two sections extending in a plane parallel to said predetermined horizontal plane from the vehicle, said sections of said upper bracket members being pivoted together, all of said sections having the same lengths, whereby said sections are interchangeable in the same or different bracket members, the inner ends of each pair of said bracket members being adapted for connection to the vehicle at spaced positions along the side thereof, the outer ends of each pair of said bracket members being pivotally connected together; and a mirror mounted between the outer ends of said pairs of bracket members to rotate about a vertical axis.

3. A mirror arrangement for a motor vehicle, said arrangement comprising: upper and lower pairs of bracket members, said upper bracket members each having two sections extending in a predetermined horizontal plane from the vehicle, said sections of said upper bracket members being pivoted together by means of a bolt extending vertically through their mutually adjacent ends, said lower bracket members each having two sections extending in a horizontal plane parallel to said predetermined horizontal plane from the vehicle, said sections of said lower bracket members being pivoted together by means of a bolt extending vertically through their mutually adjacent ends, the inner ends of each pair of said bracket members being connected to the vehicle at spaced positions along the side of the vehicle by means of brackets and bolts extending vertically through the brackets and through corresponding ends of said bracket members; a mirror assembly including a mirror housing having upper and lower studs fixed to said housing and extending, respectively, upwardly from the upper end of said housing and downwardly from the lower end of said housing, said studs being threaded through the outer ends of corresponding upper and lower pairs of said bracket members; and a nut on each of said studs to hold said outer ends of said pairs of bracket members against the upper and lower ends of said mirror housing, respectively.

4. A mirror arrangement for a motor vehicle, said arrangement comprising: upper and lower pairs of bracket members, said upper bracket members each having two sections extending in a predetermined horizontal plane from the vehicle, said sections of said upper bracket members being pivoted together by means of a bolt extending vertically through their mutually adjacent ends, said lower bracket members each having two sections extending in a plane parallel to said predetermined horizontal vehicle, said sections of said lower bracket members being pivoted together by means of a bolt extending vertically through their mutually adjacent ends, the inner ends of each pair of said bracket members being connected to the vehicle at spaced positions along the side of the vehicle by means of brackets and bolts extending vertically through the brackets and through corresponding ends of said bracket members, all of said sections of all of said bracket members being identical, whereby said sections are interchangeable not only in the same but also in different bracket members; a mirror assembly including a mirror housing having upper and lower studs fixed to said housing and extending upwardly from the upper end of said housing and downwardly from the lower end of said housing, said studs being threaded through the outer ends of corresponding upper and lower pairs of said bracket members; and a nut on each of said studs to hold said outer ends of said pairs of bracket members against the upper and lower ends of said mirror housing, respectively.

References Cited in the file of this patent

UNITED STATES PATENTS

| | | |
|---|---|---|
| 1,944,081 | Hanson | Jan. 16, 1934 |
| 2,047,325 | Jones | July 14, 1936 |
| 2,565,012 | Barrett | Aug. 21, 1951 |
| 2,632,363 | Persson | Mar. 24, 1953 |
| 2,751,817 | Lapekas | June 26, 1956 |
| 2,839,965 | Budreck | June 24, 1958 |